United States Patent
Ostrom

(10) Patent No.: US 9,624,089 B1
(45) Date of Patent: Apr. 18, 2017

(54) COLD WEATHER HYDRATION SYSTEMS, DEVICES, COMPONENTS AND METHODS

(71) Applicant: Robert Edward Ostrom, Anchorage, AK (US)

(72) Inventor: Robert Edward Ostrom, Anchorage, AK (US)

(73) Assignee: Arctic Innovations, LLC, Anchorage, AK (US)

( * ) Notice: Subject to any disclaimer, the term of this patent is extended or adjusted under 35 U.S.C. 154(b) by 778 days.

(21) Appl. No.: 13/967,850

(22) Filed: Aug. 15, 2013

Related U.S. Application Data

(63) Continuation-in-part of application No. 12/944,603, filed on Nov. 11, 2010, now Pat. No. 8,604,392.

(51) Int. Cl.
| | | |
|---|---|---|
| H05B 3/02 | (2006.01) |
| B67D 7/82 | (2010.01) |
| A45F 3/20 | (2006.01) |
| F16L 53/00 | (2006.01) |

(52) U.S. Cl.
CPC ............ B67D 7/82 (2013.01); A45F 3/20 (2013.01); F16L 53/00 (2013.01)

(58) Field of Classification Search
CPC ... B67D 7/82; A45F 3/20; F16L 53/00; H05B 2203/016; H05B 3/08; H05B 3/50; H05B 3/80
USPC ........... 219/483–486, 541, 214, 497, 494; 392/398, 401, 404, 443, 444, 447, 485
See application file for complete search history.

(56) References Cited

U.S. PATENT DOCUMENTS

| | | | |
|---|---|---|---|
| 2,285,776 A * | 6/1942 | Maccoy | H05B 1/02 219/478 |
| 4,022,347 A | 5/1977 | Noble | |
| 4,500,118 A | 2/1985 | Blenkush | |
| 4,541,657 A | 9/1985 | Smyth | |
| 4,553,023 A | 11/1985 | Jameson | |
| 4,629,098 A | 12/1986 | Eger | |
| 4,930,543 A | 6/1990 | Zuiches | |
| 5,245,693 A | 9/1993 | Ford | |
| 5,316,041 A | 5/1994 | Ramacier, Jr. | |
| 5,378,024 A | 1/1995 | Kumagai | |
| 5,520,420 A | 5/1996 | Moretti | |
| 5,536,047 A | 7/1996 | Detable | |
| 5,645,404 A | 7/1997 | Zelenak | |
| 5,859,953 A | 1/1999 | Nickless | |
| 5,879,033 A | 3/1999 | Hansel | |
| 5,975,387 A | 11/1999 | Gleason | |
| 6,039,305 A | 3/2000 | Hoskins | |
| 6,070,767 A | 6/2000 | Gardner | |
| 6,085,947 A | 7/2000 | Lien | |

(Continued)

OTHER PUBLICATIONS

Author unknown, "Stainless Steel 7254 Jack Screw," Keystone Electronics Corp., Astoria, NY, date unknown.

(Continued)

*Primary Examiner* — Mark Paschall
(74) *Attorney, Agent, or Firm* — Woods Patent Law

(57) ABSTRACT

Various embodiments of systems, devices, components, and methods are disclosed for heating a drinkable or other fluid, such as water and/or ice in a hydration system. Such embodiments include heating assemblies for hydration systems, hydration systems with heating elements, electronic control assemblies for hydration systems, and various methods of heating a drinkable or other fluid, gel or semi-solid.

16 Claims, 10 Drawing Sheets

(56) References Cited

U.S. PATENT DOCUMENTS

| | | | |
|---|---|---|---|
| 6,142,974 A | 11/2000 | Kistner | |
| 6,231,089 B1 | 5/2001 | DeCler | |
| 6,318,764 B1 | 11/2001 | Trede | |
| 6,364,168 B1 | 4/2002 | Gardner | |
| 6,382,593 B1 | 5/2002 | deCler | |
| 6,428,055 B1 | 8/2002 | Moretti | |
| 6,471,252 B1 | 10/2002 | Moretti | |
| 6,497,348 B2 | 12/2002 | Forsman | |
| 6,520,480 B2 | 2/2003 | Martin-Cocher | |
| 6,557,899 B2 | 5/2003 | Martin-Cocher | |
| 6,675,998 B2 | 1/2004 | Forsman | |
| 6,722,533 B2 | 4/2004 | Skillern | |
| 6,749,090 B2 | 6/2004 | Bailey | |
| 6,756,573 B2 | 6/2004 | Cornell | |
| 6,820,780 B2 | 11/2004 | Forsman | |
| 6,892,915 B2 | 5/2005 | Mares | |
| 6,908,015 B2 | 6/2005 | Choi | |
| 6,981,613 B1 | 1/2006 | Kamisugi | |
| 7,007,502 B2 | 3/2006 | Kreutzmann | |
| 7,063,243 B2 | 6/2006 | Forsman | |
| 7,070,075 B2 | 7/2006 | Forsman | |
| 7,073,688 B2 | 7/2006 | Choi | |
| 7,201,299 B2 | 4/2007 | Forsman | |
| 7,268,321 B2 * | 9/2007 | Natsuhara | H01L 21/67103 118/724 |
| 7,311,231 B2 | 12/2007 | Noell | |
| 7,509,692 B2 | 3/2009 | Elkins | |
| 7,533,783 B2 | 5/2009 | Choi | |
| 7,806,300 B1 | 10/2010 | Noell | |
| 7,820,946 B2 | 10/2010 | Woodfill | |
| 7,971,549 B2 | 7/2011 | Skillern | |
| 8,020,730 B2 | 9/2011 | Liang | |
| 8,083,105 B2 | 12/2011 | Reichert | |
| 8,177,097 B2 | 5/2012 | Duran | |
| 8,180,207 B2 * | 5/2012 | Shirai | E03D 9/08 392/465 |
| 8,191,727 B2 | 6/2012 | Davies | |
| 8,252,224 B2 | 8/2012 | Blain | |
| 8,267,283 B2 | 9/2012 | Staton | |
| 8,276,785 B1 | 10/2012 | Wheatley | |
| 8,276,789 B2 | 10/2012 | Emenheiser | |
| 8,408,425 B2 | 4/2013 | Lien | |
| 8,469,226 B2 | 6/2013 | Davies | |
| 8,469,405 B2 | 6/2013 | Wheatley | |
| 8,478,116 B2 * | 7/2013 | Henry | B65D 88/744 392/441 |
| 2002/0113101 A1 | 8/2002 | Skillern | |
| 2005/0029313 A1 | 2/2005 | Robins | |
| 2006/0151534 A1 | 7/2006 | Mares | |
| 2006/0289455 A1 * | 12/2006 | Nakamura | D06F 39/04 219/494 |
| 2007/0084844 A1 * | 4/2007 | Woodfill | A45F 3/04 219/214 |
| 2010/0282458 A1 * | 11/2010 | Ann | F24D 13/024 165/185 |

OTHER PUBLICATIONS

Microchip Technology Inc., "Microchip PIC102F200/202/204/206 Data Sheet," DS41239D, 2007.
Texas Instruments Incoporated, "LM3480 100 mA, SOT-23, quasi Low-Dropout Linear Voltage Regulator," 2013.
International Rectifier, "PD-91380B IRLL2705 HEXFET Power MOSFET," 1999.

* cited by examiner

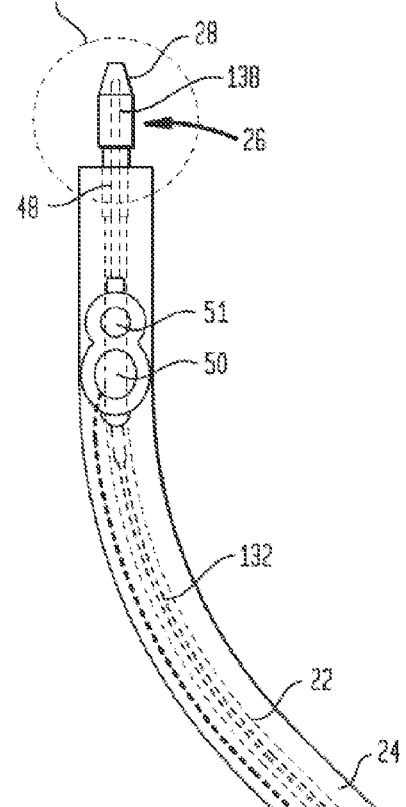
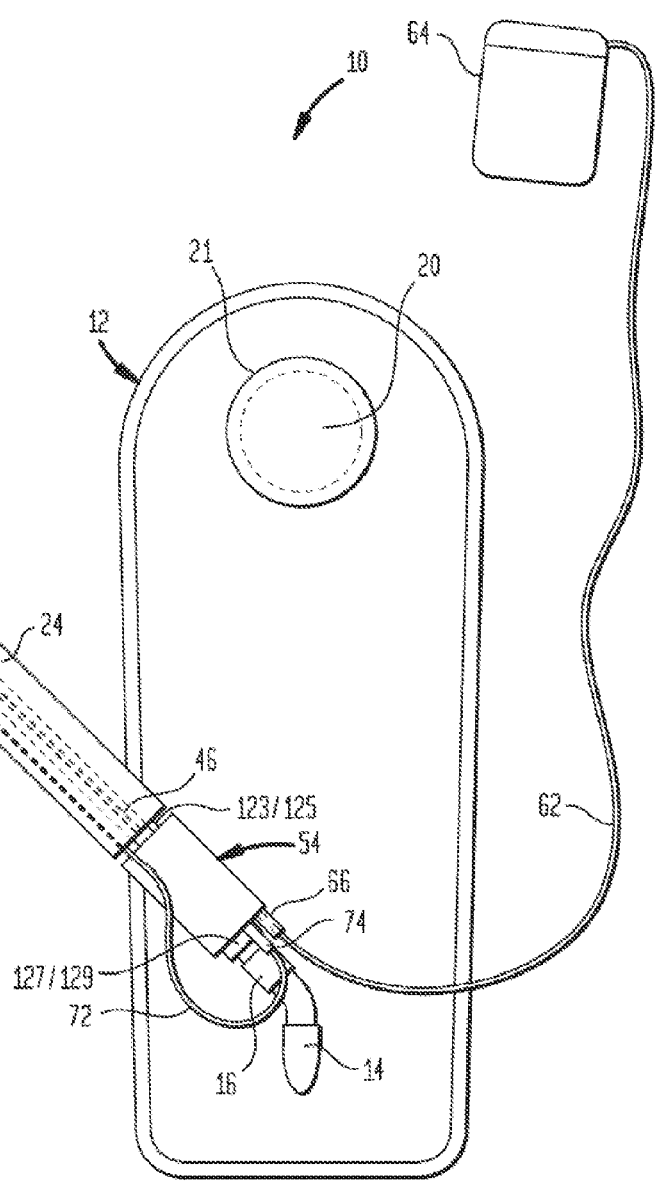
FIG. 1

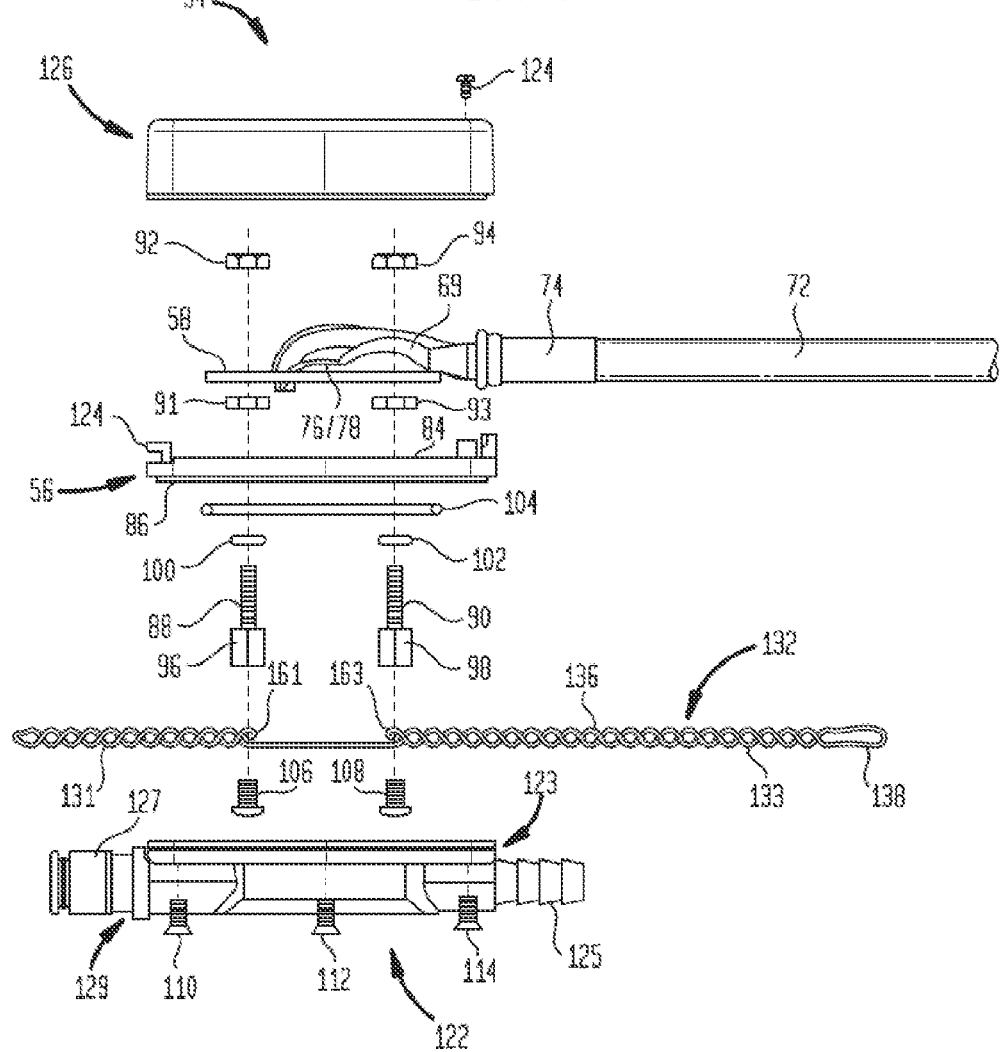

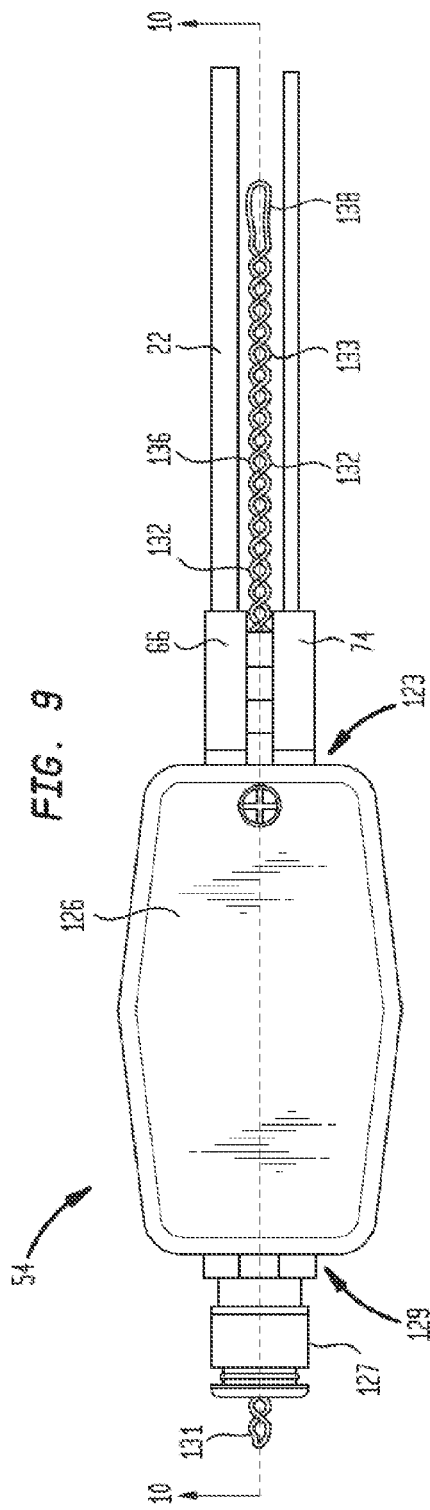
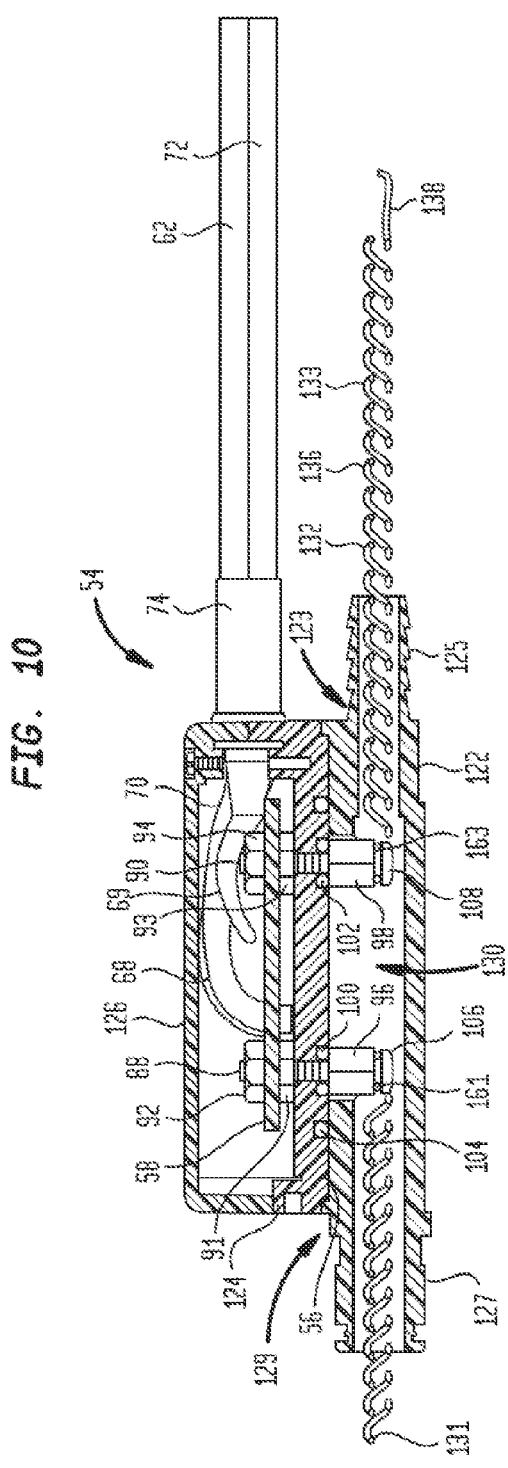

COLD WEATHER HYDRATION SYSTEMS, DEVICES, COMPONENTS AND METHODS

RELATED APPLICATIONS

This application is a continuation-in-part of, and claims priority and other benefits from, U.S. patent application Ser. No. 12/944,603 entitled "Hydration Systems and Methods" to Ostrom et al. filed Nov. 11, 2010 (hereafter "the '603 patent application"), and also claims priority and other benefits from U.S. Provisional Patent Application Ser. No. 61/311,095 filed Mar. 5, 20101 (hereafter "the '095 patent application"). The '603 and '095 patent applications are hereby incorporated by reference herein, each in its respective entirety.

FIELD OF THE INVENTION

Various embodiments of the invention described herein relate to the field of systems, devices, components, and methods for heating drinkable and other fluids, gels, aerosols and other substances and materials.

BACKGROUND

Hydration or drinking systems adapted to be worn, carried or otherwise made available to a user can comprise a bladder disposed in a backpack, a hydration bite valve, and a hydration hose extending between the bite valve and the bladder such that the user can suck water or other drinkable fluid from the bladder through the hydration hose and the hydration bite valve. Such hydration systems are typically configured so they may be employed in a substantially hands-free manner, and are often portable. Under cold weather conditions, water in one or more of the drinking hose, the bladder and the bite valve can freeze, and thereby prevent provision of drinkable fluid to the user through the hose and bite valve. Among other things, what is needed is a hydration system where a user can access and drink the drinkable fluid in the bladder or other container, notwithstanding ambient cold weather conditions and low temperatures.

Various printed publications, patents and patent applications disclosing subject matter relating directly or indirectly to the methods, systems, devices and components disclosed below include, but are not limited to, the following:

U.S. Pat. No. 2,285,776 to McCoy entitled "Hot Water Bottle," Jun. 9, 1942.

U.S. Pat. No. 4,022,347 to Noble entitled "Apparatus for pumping and dispensing liquid from pharmaceutical bottles," May 10, 1977.

U.S. Pat. No. 4,500,118 to Blenkush entitled "Fitting apparatus for soft tubing," Feb. 19, 1985; assigned to Colder Products Company.

U.S. Pat. No. 4,541,657 to Smyth entitled "Quick release hose coupling," Sep. 17, 1985; assigned to Sabco, Ltd.

U.S. Pat. No. 4,553,023 to Jameson, et al. entitled "Thermally insulated electrically heated hose for transmitting hot liquid", Nov. 12, 1985; assigned to Nordson Corporation.

U.S. Pat. No. 4,629,098 to Eger entitled "Portable Liquid Dispenser", Dec. 16, 1986.

U.S. Pat. No. 4,930,543 to Zuiches entitled "Protective Cover for Hose Connectors", Jun. 5, 1990.

U.S. Pat. No. 5,245,693 to Ford, et al. entitled "Parenteral fluid warmer apparatus and disposable cassette utilizing thin, flexible heat-exchange membrane", Sep. 14, 1993, assigned to In-Touch Products Co.

U.S. Pat. No. 5,316,041 to Ramacier Jr, et al. entitled "Quick Connection coupling valve assembly", May 31, 1994, assigned to Colder Product Co.

U.S. Pat. No. 5,378,024 to Kumagai, et al. entitled "Quick connector", Jan. 3, 1995, assigned to Tokai Rubber Industries Ltd.

U.S. Pat. No. 5,520,420 to Moretti entitled "Protective cap for a releasable quick-action closure coupling", May 28, 1996, assigned to A. Raymond and Cie.

U.S. Pat. No. 5,536,047 to Detable, et al. entitled "Quick connection for fitting a rigid tube in a connector", Jul. 16, 1996, assigned to Etablissments Caillau.

U.S. Pat. No. 5,645,404 to Zelenak entitled "Personal fluid dispensing device", Jul. 8, 1997 assigned to Z Industry, Inc.

U.S. Pat. No. 5,859,953 to Nickless entitled "Electric heating apparatus for deicing pipes utilizing flexible heated hose inserted into pipe", Jan. 12, 1999.

U.S. Pat. No. 5,879,033 to Hansel, et al. entitled "Hose connector", Mar. 9, 1999 assigned to A. Raymond & Cie.

U.S. Pat. No. 5,975,387 to Gleason, et al. entitled "Bladder frame backpack", Nov. 2, 1999 assigned to K 2 Corporation.

U.S. Pat. No. 6,039,305 to Hoskins, et al. entitled "Bite valve for hydration bladder", Mar. 21, 2000, assigned to K 2 Corporation.

U.S. Pat. No. 6,070,767 to Gardner, et al. entitled "Personal hydration system with an improved mouthpiece", Jun. 6, 2000, assigned to CamelBak Products, Inc.

U.S. Pat. No. 6,085,947 to Lien entitled "Soft type mouthpiece with water releasing and water stopping functions", Jul. 11, 2000.

U.S. Pat. No. 6,142,974 to Kistner, et al. entitled "Portable I.V. fluid warming system", Nov. 7, 2000 assigned to Estill Medical Technologies, Inc.

U.S. Pat. No. 6,231,089 to DeCler, et al. entitled "Two piece molded female coupling", May 15, 2001 assigned to Colder Products Company.

U.S. Pat. No. 6,318,764 to Trede, et al. entitled "Detachable rapid-action coupling device", Nov. 20, 2001 assigned to A. Raymond & Cie.

U.S. Pat. No. 6,364,168 to Gardner, et al. entitled "Personal hydration system with an improved mouthpiece", Apr. 2, 2002 assigned to CamelBak Products, Inc.

U.S. Pat. No. 6,382,593 to deCler, et al. entitled "Fluid coupling", May 7, 2002 assigned to Colder Products Company.

U.S. Pat. No. 6,428,055 to Moretti, et al. entitled "Releasable quick coupling for metal pipes", Aug. 6, 2002 assigned to A. Raymond & Cie.

U.S. Pat. No. 6,471,252 to Moretti, et al. entitled "Releasable plug-in connector for high pressure lines", Oct. 29, 2002 assigned to A. Raymond & Cie.

U.S. Pat. No. 6,497,348 to Forsman, et al. entitled "Hydration system with improved fluid delivery system", Dec. 24, 2002 assigned to CamelBak Products, Inc.

U.S. Pat. No. 6,520,480 to Martin-Cochner, et al. entitled "Plug connection with outlet shut-off", Feb. 18, 2003 assigned to A. Raymond & Cie.

U.S. Pat. No. 6,557,899 to Martin-Cochner, et al. entitled "Releasable plug coupling with protective sleeve", May 6, 2003 assigned to A. Raymond & Cie.

U.S. Pat. No. 6,675,998 to Forsman, et al. entitled "Hydration system with improved fluid reservoir", Jan. 13, 2004 assigned to CamelBak Products, Inc.

U.S. Pat. No. 6,722,533 to Skillern entitled "Hydration pouch with detachable hose", Apr. 20, 2004.

U.S. Pat. No. 6,749,090 to Bailey entitled "Dual bladder sports hydration system", Jun. 15, 2004 assigned to Trek Bicycle Corp.

U.S. Pat. No. 6,756,573 to Cornell entitled "Heated golf club grip", Jun. 29, 2004.

U.S. Pat. No. 6,820,780 to Forsman, et al. entitled "Neck-supported fluid reservoir, hydration systems and pack assemblies including the same" Nov. 23, 2004 assigned to CamelBak Products, Inc.

U.S. Pat. No. 6,892,915 to Mares entitled "Pack frame assembly and hydration systems incorporating the same", May 17, 2005 assigned to CamelBak Products, LLC.

U.S. Pat. No. 6,908,015 to Choi, et al. entitled "Personal hydration system with component connectivity", Jun. 21, 2005 assigned to CamelBak Products, LLC.

U.S. Pat. No. 6,981,613 to Kamisugi entitled "Portable pressurized liquid storage system", Jan. 3, 2006.

U.S. Pat. No. 7,007,502 to Kreutzmann, et al. entitled "In-car hydration systems", Mar. 7, 2006 assigned to Stokley-Van Camp, Inc.

U.S. Pat. No. 7,063,243 to Forsman, et al. entitled "Hydration system with improved fluid reservoir", Jun. 20, 2006 assigned to CamelBak Products, LLC.

U.S. Pat. No. 7,070,075 to Forsman, et al. entitled "Hydration system with improved fluid reservoir", Jul. 4, 2006 assigned to CamelBak Products, LLC.

U.S. Pat. No. 7,073,688 to Choi, et al. entitled "Personal hydration system with component connectivity", Jul. 11, 2006 assigned to CamelBak Products, LLC.

U.S. Pat. No. 7,201,299 to Forsman, et al. entitled "Waist-mounted hydration system", Apr. 10, 2007 assigned to CamelBak Products, LLC.

U.S. Pat. No. 7,311,231 to Noell, et al. entitled "Disposable pouch hydration system", Dec. 25, 2007 assigned to Blackhawk Industries Product Group Unlimited, LLC.

U.S. Pat. No. 7,509,692 to Elkins, et al. entitled "Wearable personal cooling and hydration system", Mar. 31, 2009 assigned to bioCOOL technologies, LLC.

U.S. Pat. No. 7,533,783 to Choi, et al. entitled "Drink bottles with bite-actuated mouthpieces", May 19, 2009 assigned to CamelBak Products, LLC.

U.S. Pat. No. 7,806,300 to Noell, et al. entitled "Hydration system", Oct. 5, 2010 assigned to Blackhawk Industries Product Group Unlimited, LLC.

U.S. Pat. No. 7,820,946 to Woodfill, et al. entitled "Heated hydration system", Oct. 26, 2010 assigned to The North Face Apparel Corp.

U.S. Pat. No. 7,971,549 to Skillern, et al. entitled "Hydration system for kayak integration", Jul. 5, 2011 assigned to Oakley, Inc.

U.S. Pat. No. 8,020,730 to Liang, et al. entitled "Slosh controlled personal hydration system", Sep. 20, 2011 assigned to The North Face Apparel Corp.

U.S. Pat. No. 8,083,105 to Reichert, et al. entitled "Pressurized fluid delivery system", Dec. 27, 2011.

U.S. Pat. No. 8,177,097 to Duran entitled "Personal hydration systems, dryer mechanisms for use with personal hydration systems, and methods of drying personal hydration systems reservoirs", May 15, 2012 assigned to CamelBak Products, LLC.

U.S. Pat. No. 8,191,727 to Davies, et al. entitled "Drink containers", Jun. 5, 2012 assigned to CamelBak Products, LLC.

U.S. Pat. No. 8,252,224 to Blain entitled "Methods of assembling multi-layered drink containers", Aug. 28, 2012 assigned to CamelBak Products, LLC.

U.S. Pat. No. 8,267,283 to Staton entitled "Personal hydration system", Sep. 18, 2012 assigned to Nalge Nunc International Corporation.

U.S. Pat. No. 8,276,785 to Wheatley, et al. entitled "NBC/CBRNE personal hydration system", Oct. 2, 2012 assigned to E. Wheatley Enterprises, Inc.

U.S. Pat. No. 8,276,789 to Emenheiser entitled "Heat transfer apparatus", Oct. 2, 2012.

U.S. Pat. No. 8,408,425 to Lien entitled "Hydration device", Apr. 2, 2013.

U.S. Pat. No. 8,469,226 to Davies, et al. entitled "Drink containers", Jun. 25, 2013 assigned to CamelBak Products, LLC.

U.S. Pat. No. 8,469,405 to Wheatley, et al. entitled "Securing mechanism for a coupling device", Jun. 25, 2013 assigned to Dave Wheatley Enterprises Inc.

U.S. Patent Publication No. 2002/0113101 to Skillern entitled "Hydration pouch with integral thermal medium", Aug. 22, 2002.

U.S. Patent Publication No. 2005/0029313 to Robins, et al. entitled "Personal hydration system", Feb. 10, 2005 assigned to Fiskars Brands, Inc.

U.S. Patent Publication No. 2006/0151534 to Mares entitled "Freeze resistant hydration systems", Jul. 13, 2006.

The dates of the foregoing publications may correspond to any one of priority dates, filing dates, publication dates and issue dates. Listing of the above patents and patent applications in this background section is not, and shall not be construed as, an admission by the applicants or their counsel that one or more publications shown in the above list constitute prior art in respect of the applicant's various inventions. All printed publications, patents and patent applications referenced above or otherwise herein are hereby incorporated by referenced herein, each in its respective entirety.

Upon having read and understood the Summary, Detailed Description and Claims set forth below, those skilled in the art will appreciate that at least some of the systems, devices, components and methods disclosed in the printed publications listed herein may be modified advantageously in accordance with the teachings of the various embodiments that are disclosed and described herein.

SUMMARY

In one embodiment, there is provided a heating assembly for a portable hydration system comprising a housing, a heating element connection assembly comprising a plurality of heating element terminals, and a heating element, wherein at least one of the housing and the heating element connection assembly is configured to permit a drinkable liquid to pass between proximal and distal thereof and through at least one interior volume thereof, the heating element is disposed at least partially in the interior volume and comprises first and second ends operably connected to at least two of the plurality of heating element terminals, respectively, the heating element is configured to receive electrical current from an electrical power source through the at least two heating element terminals to provide resistive heating of the heating element and thereby heat the drinkable fluid in at least the interior volume, the heating element connection assembly is attached to, connected to, or forms a portion of the housing, the proximal end of at least one of the housing and the heating element connection assembly is configured for attachment to a hydration bladder or container configured to hold the drinkable fluid, and the distal end of at least one of the housing and the heating element connection assembly is configured for attachment to a hydration hose.

In one embodiment, there is provided an electronic control assembly for a portable hydration system comprising a processor, and a user-operable control operably connected to the processor, wherein the processor and user-operable control are configured to operate in conjunction with a source of electrical power operably connected to the processor and the user-operable control, the processor and the user-operable control are configured to controllably deliver electrical current from the power source to a heating assembly in the hydration system, the processor comprises at least one programmable memory for storing machine-readable instructions corresponding to at least two of a first burst heating mode, a second constant heating mode, and a third temperature feedback heating control mode, the processor is configured to execute the at least two heating modes, and at least two of the heating modes are selectable by the user through the user-operable control.

In another embodiment, there is provided a portable hydration system comprising a hydration bladder or container configured to hold a drinkable fluid, a hydration hose, a housing, a heating element connection assembly comprising a plurality of heating element terminals, a heating element, and a user-actuated electronic control assembly operably connected to the heating element connection assembly, wherein at least one of the housing and the heating element connection assembly is configured to permit a drinkable liquid to pass between proximal and distal thereof and through at least one interior volume thereof, the heating element is disposed at least partially in the interior volume and comprises first and second ends operably connected to at least two of the plurality of heating element terminals, respectively, the heating element is configured to receive electrical current from an electrical power source through the at least two heating element terminals to provide resistive heating of the heating element and thereby heat the drinkable fluid in at least the interior volume, the heating element connection assembly is attached to, connected to, or forms a portion of the housing, the proximal end of at least one of the housing and the heating element connection assembly is configured for attachment to the hydration bladder or container configured to hold the drinkable fluid, the distal end of at least one of the housing and the heating element connection assembly is configured for attachment to the hydration hose, and the heating element connection assembly and the housing are disposed between the hose and the bladder or container, and at least portions of the heating element extend into the hose.

In still another embodiment, there is provided a method of heating a drinkable fluid in at least one of a hydration system, a hydration hose, a hydration hose bite valve, and a heating assembly, comprising selecting a first burst heating mode or a second constant heating mode, and in response to selecting the first burst heating mode or the second constant heating mode, delivering electrical current to a heating element disposed within at least portions of at least one of the hydration hose and the bite valve, wherein the electrical current is delivered to the heating element for a first predetermined short period of time in the first burst heating mode, and the electrical current is delivered to the heating element for a second predetermined long period of time in the second constant heating mode.

In yet another embodiment, there is provided a method of heating a drinkable fluid in at least one of a hydration system, a hydration hose, a hydration hose bite valve, and a heating assembly, comprising selecting a first burst heating mode or a second temperature feedback heating mode, and in response to selecting the first burst heating mode or the second temperature feedback heating mode, delivering electrical current to a heating element disposed within at least portions of at least one of the hydration hose and the bite valve, wherein the electrical current is delivered to the heating element for a first predetermined short period of time in the first burst heating mode, and the electrical current is delivered to the heating element for a second predetermined period of time in the temperature feedback heating mode, the second predetermined period of time being determined in accordance with a sensed temperature.

In a further embodiment, there is provided a method of heating a drinkable fluid in at least one of a hydration system, a hydration hose, a hydration hose bite valve and a heating assembly, comprising delivering electrical current to a heating element operably connected to a heating assembly comprising a heating housing configured to permit the drinkable liquid to pass between proximal and distal ends of the housing and through at least one interior volume thereof, the heating element comprising at least first and second ends, the heating assembly comprising a heating element connection assembly, the heating element connection assembly being operably connected to or forming a portion of the housing and further being operably connected to the first and second ends of the heating element, respectively, wherein the heating assembly is disposed between a bladder or container configured to hold the drinkable fluid and the hose, and at least portions of the heating element extend into at least portions of one of the hose and the bite valve, the heating element being configured to heat drinkable fluid in proximity to at least portions thereof.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

FIG. 1 shows one embodiment of a heated hydration system 10;

FIGS. 6 through 10 show various views according to one embodiment of a heating assembly 54;

The drawings are not necessarily to scale. Like numbers refer to like parts or steps throughout the drawings.

DETAILED DESCRIPTIONS OF SOME EMBODIMENTS

Figure 2:
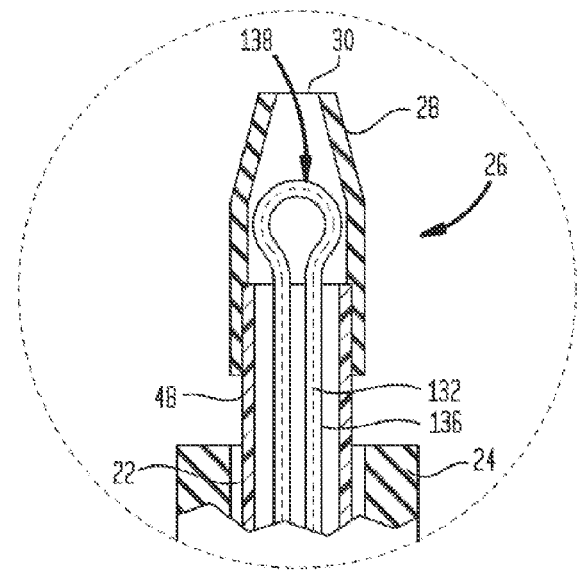
FIG. 2 shows a cross-sectional view according to one embodiment of bite valve assembly 26.

Described herein are various embodiments of systems, devices, components and methods for heating a drinkable fluid in a hydration system, a hydration bladder or container, a hydration hose, a hydration bite valve, and a heating assembly.

Referring now to FIG. 1, there is shown one embodiment of a heated hydration system 10. In the embodiment shown in FIG. 1, heating system 10 comprises a hydration bladder 12, a hydration hose 22 extending between proximal ends 46 and distal end 48 thereof, and a hydration bite valve 28 disposed near the distal end 48 of hydration hose 22. Heating assembly 54 comprises proximal and distal ends 129 and 123, respectively, and is disposed between bladder outlet connector 16 and the proximal end 46 of hydration hose 22. An electrical power source 64 is operably connected to heating assembly 54 via insulated electrical conductors 62. User-actuated control and/or interface 50 is operably connected to heating assembly 54 via insulated electrical conductors 72. Visual indicator 51 (which may be, by way of example, one or a plurality of LEDs) can be configured to provide the user with information concerning whether heating element 132 is being energized, the state of charge of electrical power source 64, the current operating mode of circuit 60, and myriad other forms or types of visual feedback or state concerning system 10. According to some embodiments, user actuated control 50 and visual indicator 51 are together configured to provide a user interface, more about which is said below.

Heating element 132 is operably connected to electrical power source 64 through heating assembly 54, and in the embodiment shown in FIG. 1 extends from heating assembly 54 into the interior of hydration hose 22 and thence into the vicinity of hydration bite valve 28. In one embodiment, heating element 132 is an electrically resistive wire or plurality of wires that receive electrical current from electrical power source 64 through heating assembly 54 to effect heating of the drinkable fluid, or frozen or congealed drinkable fluid, as the case may be, that surrounds or is in the vicinity of heating element 132. In some embodiments, heating element 132 is a nichrome or other metal or metal alloy wire or plurality of wires that are covered by an electrically insulative sheath 136 (see, for example, FIG. 9).

In one embodiment, user-actuated control 50 and visual indicator 51 are employed by a user to selectably control the delivery of electrical current from electrical power source 64 to heating assembly 54 and heating element 132. Heating assembly 54 is operably connected at proximal end 129 thereof to bladder outlet connector 16 via connector 127 (see FIGS. 6 through 9), which in turn is operably connected to outlet 14 of bladder 12. Heating assembly 54 is further operably connected at distal end 123 thereof to proximal end 46 of hydration hose 22 via connector 125 (see FIGS. 6 through 9). System 10 is configured so that the user can suck the drinkable fluid in bladder 12 through outlet 14 and bladder connector 16, heating assembly 54, hydration hose 22, and bite valve 28. In one embodiment, connectors 127 and 125 are releasable from bladder 12 and bladder connector 16, and hydration hose 22, respectively.

In one embodiment, heating circuit 60 (not shown in FIG. 1—see FIGS. 6 through 12) is configured to receive electrical power from electrical power source 64 and control signals received from user actuated control/interface 50, and thus forms a portion of electronic control assembly 140, more about which is said below. Circuit 60 and electronic control assembly 140 are together configured to controllably distribute electrical power to electrical terminals 88 and 90 of heating assembly 54, and thence to the ends of heating element 132 disposed within heating assembly 54, thereby to effect resistive heating of heating element 132 in accordance with control signals provided by the user through user actuated control 50. According to some embodiments, user actuated control 50 is any one or more of a manually-operated switch, a capacitive switch, an actuator, a rotary switch, a single- or double-pole switch, a biased switch, a toggle switch, a reversing switch, or an electronic switch.

Figure 5:
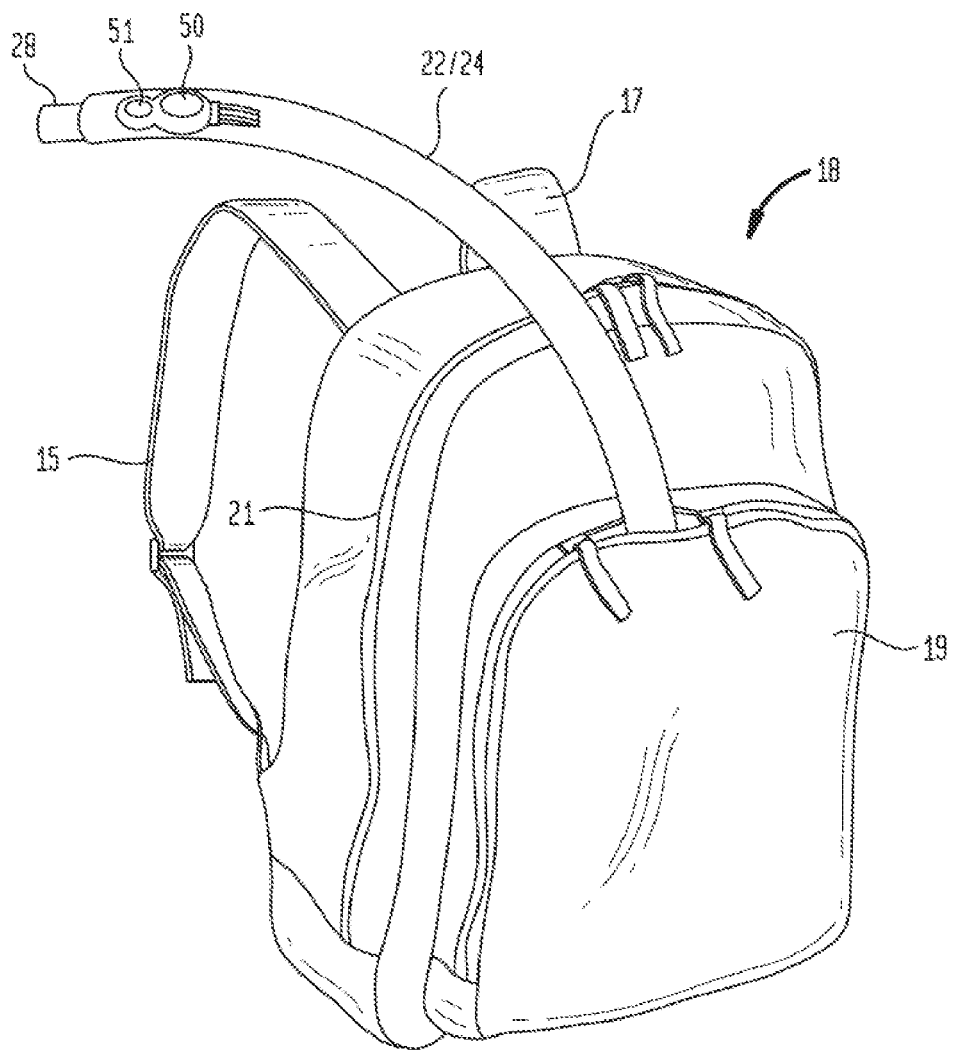
FIG. 5 shows one embodiment of a backpack 18.
Figure 6:
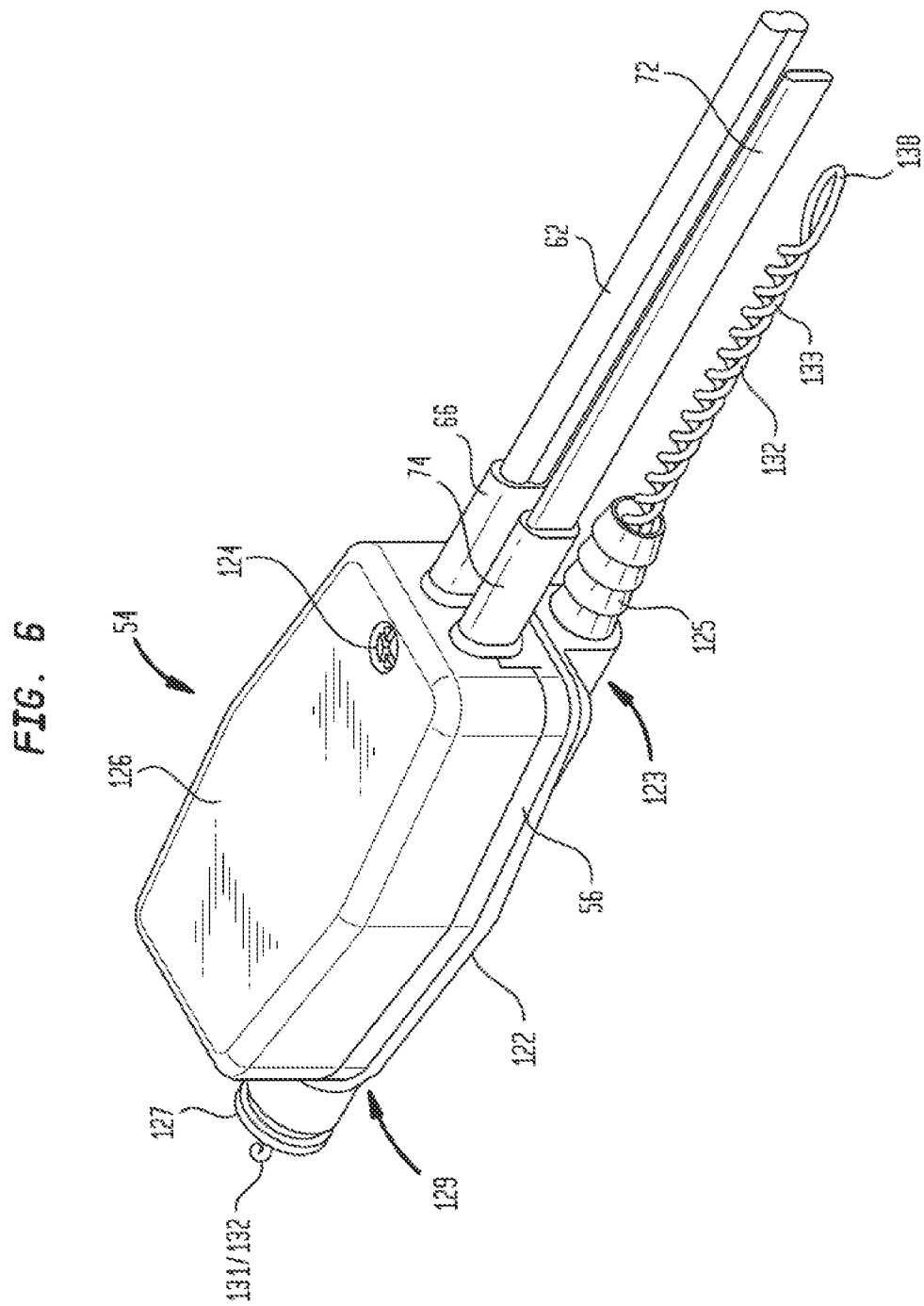
Figure 7:
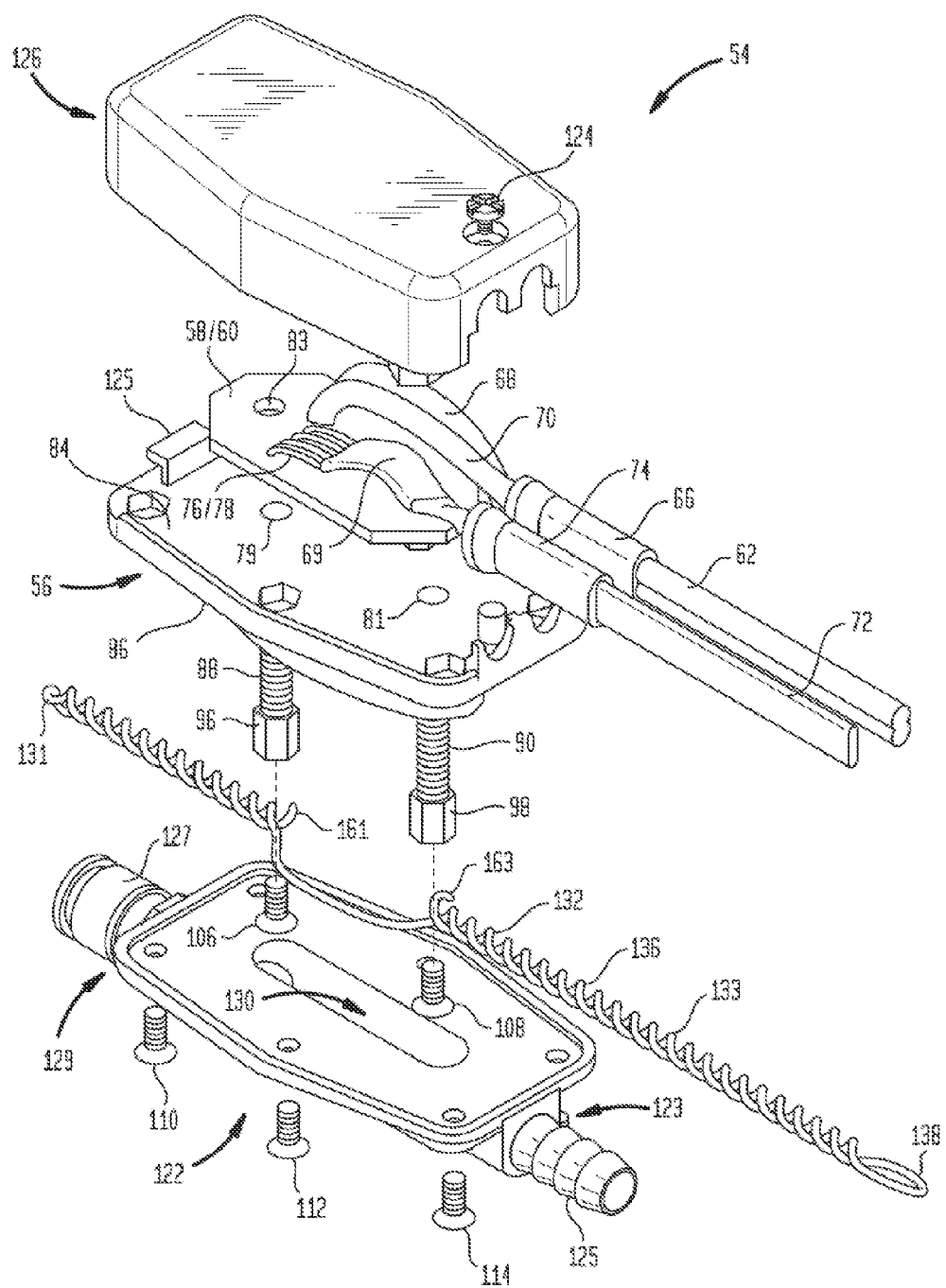

In one embodiment, circuit 60 is mounted on and/or forms a portion of a substrate such as a printed circuit board 58, which in turn may be mounted on or inside heating assembly 54 and/or a battery pack or other housing in which electrical power source 64 is contained (see FIGS. 6, 7 and 8). Those skilled in the art will understand that circuit 60, as well as one or more of the various components of electronic control assembly 140, may be mounted on, attached to, or form a portion of myriad different components or devices in system 10, including, but not limited to, backpack 18 (see FIG. 5), bladder 12, hydration hose 22, and so on.

Continuing to refer to FIG. 1, it will be seen that hydration hose 22 can be covered by an insulative covering or sheath 24, which is preferred under cold weather conditions to better insulate hose 22 and the drinkable fluid, congealed fluid or frozen fluid contained therein, and also to prevent the loss of excessive heat energy to the outside air when heating element 132 is energized and heated by electrical current flowing therethrough. Drinkable fluids are placed in bladder 12 via bladder fill port 20, which in the embodiment shown in FIG. 1 includes a fill cap 21.

Note that many other types of containers other than a hydration bladder may be employed in system 10, such as bottles, cans, flasks, reservoirs, cylinders, NALGENE® containers, plastic containers, metal containers, portable containers, containers configured for placement in horse or bicycle panniers, stationary containers configured to be mounted on a bicycle, snowmachine or other mechanized vehicle, and so on. In other embodiments, system 10 may be configured to hold and heat fluids, gels or other materials or substances that may be drinkable or eatable, or not, such as aerosols, fluids, gels, jellies, semisolids, visco-elastic fluids, glues, adhesives, fuels, paint, lubricants, coatings, rustproofers, and so on for many types of applications, including industrial or work-related applications.

In some embodiments, electrical power source 64 comprises a plurality of primary or secondary batteries electrically connected to one another and circuit 60, and that are disposed within a battery housing or pack. In some embodiments, a plurality of four to eight lithium AA batteries provides good results under cold weather conditions owing to their high charge density and capacity, and their good performance at cold temperatures. In some embodiments, circuitry may be included in system 10 for charging or recharging the primary or secondary batteries of electrical power source 64. In other embodiments, electrical power source 64 comprises a vehicle-provided source of electrical power, which may be provided through, by way of example, a vehicular cigarette lighter connector mounted on a snowmachine, truck, automobile or other vehicle. In still further embodiments, electrical power source 64 comprises household or other 120 volt ac power, which is then rectified to a suitable DC voltage, either externally, or in circuitry included in system 10.

Referring now to FIG. 2, there is shown an enlarged cross-sectional view according to one embodiment of bite valve assembly 26 illustrated in FIG. 1. As shown in FIG. 2, in one embodiment bite valve assembly 26 comprises bite valve 28, which is configured to fit over the distal end 48 of hydration hose 48. The distal end 138 of heating element 132 is disposed adjacent or near bite valve opening 30 of bite valve 28 to facilitate heating of the drinkable fluid, or of a congealed or frozen fluid, in the vicinity thereof.

Figure 3:
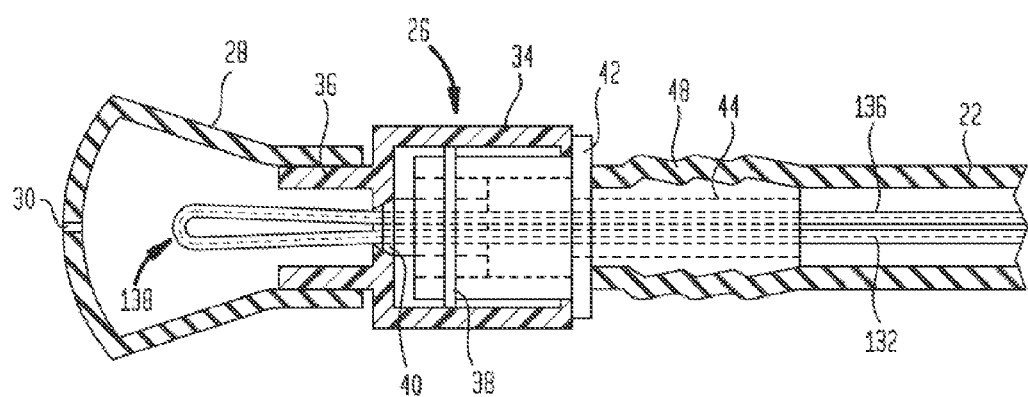
FIG. 3 shows a cross-sectional view according to another embodiment of bite valve assembly 26.

In FIG. 3 there is shown a cross-sectional view according to another embodiment of bite valve assembly 26. As shown in FIG. 3, bite valve assembly 26 comprises bite valve 28, bite valve opening 30, bite valve base member 42 with barbed connector 44 attached thereto and having peripheral flange 38 forming a portion thereof, bite valve annulus 36 of bite valve support member 34, and bite valve heating element support member 40. Distal end 48 of hydration hose 22 slides over and attaches to barbed connector 44 of bite valve base member 42. Bite valve 28 attaches to and slides over annulus 36 of bite valve support member 36. As in the embodiment shown in FIG. 2, the looped distal end 138 of heating element 132 is disposed adjacent or near bite valve opening 30 of bite valve 28 to facilitate heating of the drinkable fluid, or of a congealed or frozen fluid, in the vicinity thereof.

Figure 4:
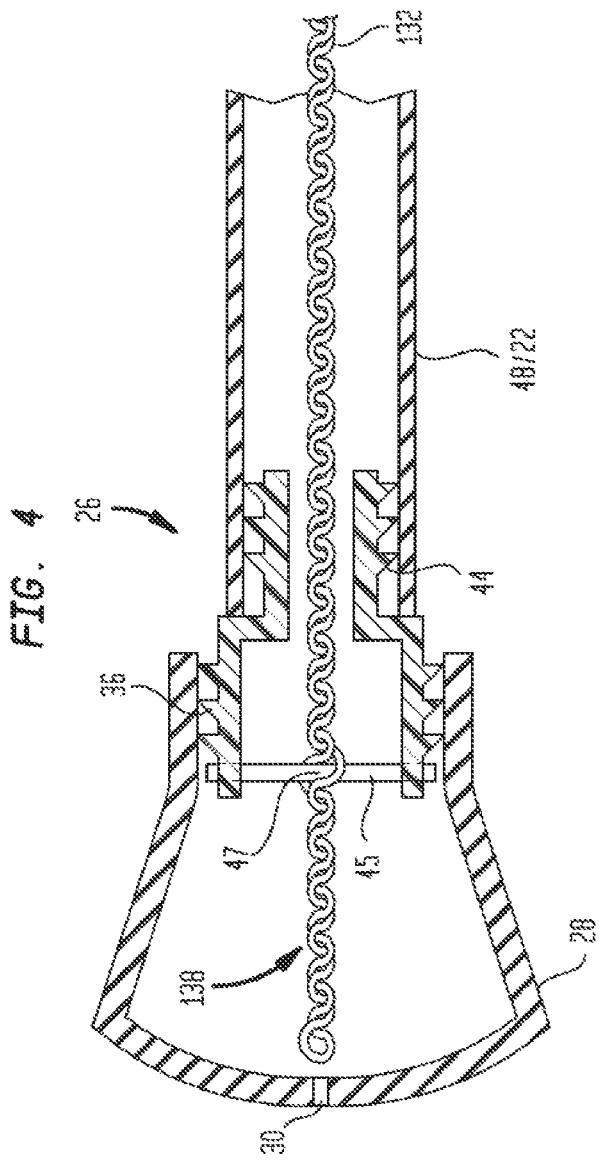
FIG. 4 shows a cross-sectional view according to yet another embodiment of bite valve assembly 26.

FIG. 4 shows a cross-sectional view according to yet another embodiment of bite valve assembly 26. As shown in FIG. 4, bite valve assembly 26 comprises bite valve 28, bite valve opening 30, bite valve base member 36 with barbed connector 44 attached thereto, barbed bite valve annulus 36, and dowel 45 positioned and configured to hold heating element 132 in place within bite valve 28 by being threaded through loop 47 formed near the distal end of heating element 132. Distal end 48 of hydration hose 22 slides over and attaches to barbed connector 44 of bite valve base member 42. Bite valve 28 attaches to and slides over annulus 36. As in the embodiment shown in FIGS. 2 and 3, the looped distal end 138 of heating element 132 is disposed adjacent or near bite valve opening 30 of bite valve 28 to facilitate heating of liquid, or of a congealed or frozen liquid, in the vicinity thereof.

FIG. 5 shows one embodiment of a backpack 18 that may be employed as a portion of, or in conjunction with, hydration system 10. Backpack 18 comprises should straps 15 and 17, bladder carrying portion 19, and main cargo compartment 21. In one embodiment of system 10, any one or more of user control 50, electronic control assembly 140, and/or electrical power source 64 may be mounted, attached or otherwise disposed in or on backpack 18. Those skilled in the art will appreciate that many other types of devices for carrying hydration system 10 may be employed in addition to a backpack, such as a waistbelt, a fanny pack, a chest pack, a suitably configured belt, and so on.

Referring now to FIGS. 6, 7, 8, 9 and 10, there is shown one embodiment of a heating assembly 54. FIG. 6 shows a top perspective view of heating assembly 54. FIG. 7 shows an exploded top perspective view of heating assembly 54. FIG. 8 shows a side exploded view of heating assembly 54. FIG. 9 shows a top view of heating assembly 54, and FIG. 10 shows a cross-sectional side view of heating assembly 54 of FIG. 9.

In the embodiment shown in FIG. 6, heating assembly 54 comprises three major components: cover 126, heating element connection assembly 56, and housing 122. Cover 126 sits atop and attaches to heating element connection assembly 56, which in turn is attached to underlying housing 122. As described above, and in one embodiment, housing 122 further comprises proximal connector 127 configured for releasable or other connection to bladder connector 16, proximal end 129, distal end 123, and distal connector 125 configured for attachment to proximal end 46 of hydration hose 22. As shown, portions of heating element 132 are disposed within heating assembly 54 and extend outwardly therethrough from connectors 127 and 125. In one embodiment, proximal end 131 of heating element is configured to project into corresponding bladder connector 16 and/or into portions of bladder 12, and distal end 133 is configured to project into at least portions of hydration hose 122. Looped end 138, not necessarily shown to scale in FIGS. 6 through 10, is configured for placement near or in bite valve 28. Barbed or other connector 125 is configured for attachment to the proximal end 46 of hydration hose 22.

Referring now to FIGS. 7, 8, 9 and 10, further details are shown concerning the embodiment of heating assembly 54 illustrated in FIG. 6. Electrical power source 64 shown in FIG. 1 is operably connected to heating assembly 54 via insulated electrical conductors 62. User-actuated control and/or interface 50 and indicator 51 shown in FIG. 1 are operably connected to heating assembly 54 via insulated electrical conductors 72. Ends 161 and 163 of heating element 132 are operably connected to electrical power source 64 through terminals 88 and 90, which in turn extend through heating element connection assembly 56 for connection to heating circuit 60 disposed in or on printed circuit board or substrate 58. Shrink wrap 69 covers portions of the electrical wires corresponding to the electrical conductors associated with user-actuated control 50. Overmolded strain reliefs 74 and 76 protect the electrical conductors associated with electrical power source 64 and user-actuated control 50/indicator 51. Cover 126 hingeably attaches to heating element connection assembly 56 by means of tang 125 and a corresponding recess in cover 126. Screw 124 attaches the opposing end of cover 126 to heating element connection assembly 56 to form a suitable seal with heating element connection assembly 56.

Continuing to refer to FIGS. 7, 8, 9 and 10, printed circuit board 58 is attached to heating element connection assembly 56 by electrically conductive and threaded bolts 88 and 90 (of the type known as a "jack screw") and nuts 92 and 94 (see FIGS. 8 and 10). One example of a suitable jack screw is a Model No. 7254 stainless steel jack screw sold by Keystone Electronics Corp. of Astoria, N.Y. Nuts 91 and 93 are disposed between printed circuit board 58 and heating element connection assembly 56, and mounted on bolts 88 and 90. O-rings 100 and 102 (see FIG. 7) provide a liquid seal between interior volume 130 of housing 122 (through which the drinkable fluid passes) and lower surface 86 of heating element connection assembly 56 (which is adjacent to interior volume 130), and the upper surface 84 of heating element connection assembly 56. O-rings 100 and 102 are compressed when nuts 91 and 93 are tightened, thereby to provide effective liquid seals. O-ring 104 is configured to provide a liquid seal between interior volume 130 and the lower portion 86 of heating element connection assembly 56, and the upper portion 84 of heating element connection assembly 56. Means other than O-rings may be employed to effect such a liquid seal, such as silicone or any other suitable adhesive or sealant, or threaded recesses to receive bolts 88 and 90 therethrough which have tight tolerances, or which have compressible sidewalls.

Alternatively, the volume between cover 126 and heating element connection assembly 56 may be potted with a suitable sealant such as a high dielectric silicone to provide water resistance and protection for printed circuit board 58 and its various electrical connections and terminals. As can be seen, however, embodiments of heating assembly 54 that provide a removable cover 126 and leak-tightness between interior volume 130 and upper portion 84 of heating element connection assembly 56 are desirable because while they provide leaktightness and protection, they also permit repairs and updating of the electrical circuitry disposed therein, without the need to remove potting material.

Threaded machine screws 106 and 108 are configured to attach to the undersides of threaded bolts or jack screws 88 and 90 through heads 96 and 98 thereof, which contain internal threaded recesses (not shown in the Figures) to receive the threaded portions of machine screws 106 and 108 therein. Threaded machine screws 110, 112, 114 (and three similar machine screws disposed on the opposite side of housing 122, but not shown in the Figures) are configured to attach housing 122 to heating element connection assembly 56.

Referring now to FIGS. 6 through 10, it is to be noted that many different embodiments of heating assembly 54 are contemplated, such as embodiments where housing 122 and heating element connection assembly 56 share an interior volume through which drinkable liquids may pass, embodiments where cover 126, heating element connection assembly 56, and housing 122 are all molded or glued together with circuitry 60 disposed therewithin or attached thereto, or, for example, embodiments where heating terminals 88 and 90 have no heating element 132 attached thereto, and where terminals 88 and 90 serve as electrically resistive elements to effect heating of drinkable liquid disposed within the interior volume.

Additionally, heating element 132 may be configured in many different embodiments, such as those where heating element 132 is configured to: (a) heat only interior volume 130; (b) heat interior volume 130 and a portion of hydration hose 22; (c) heat interior volume 130 and substantially all or most of hydration hose 22; (d) heat interior volume 130 and a portion of bladder connector 16 and/or bladder outlet 14, and (e) heat interior volume 130, a portion of bladder connector 16 and/or bladder outlet 14, and at least a portion of hydration hose 22. Still further embodiments of heating element 132 are contemplated, such as those where heating element 132 comprises: (a) a suitably configured flexible ribbon substrate formed, e.g., of KAPTON®, and having one or more flexible electrical conductors disposed thereon or therein; (b) a coiled or other wire, electrically insulated or not, that is disposed inside hydration hose 22 but configured and located to lie adjacent to and/or in contact with the inner diameter and inner sidewalls of hose 22; (c) one or more electrical conductors molded into the sidewalls of hose 22; (d) one or more electrical conductors wrapped around or encircling exterior portions of hydration hose 22; (e) one or more electrically conductive metal strips, plates, ribbons, or members arranged in a desired configuration (e.g., flat, curved, spirally-wound, etc.) and covered with a suitable electrically insulative material such as a suitable plastic or high-dielectric silicone, and (f) a plurality of braided or stranded electrical wires or electrical conductors. Those skilled in the art will understand that many other combinations, modifications, and permutations of heating element 132 may also be employed.

Heating terminals 88 and 90 may also assume any of a number of different forms and configurations other than threaded bolts, such as electrically conductive vias, crimped connections, wires, metal posts, flexible printed circuits or ribbons, and the like. The manner in which electrical connections between heating element ends 161 and 163 and terminals 88 and 90, and between circuit 60 and terminals 88 and 90, may also assume any of a number of different forms and configurations other than threaded mechanical connections, such as crimps, solder, plug-in connectors, and the like.

Figure 11:
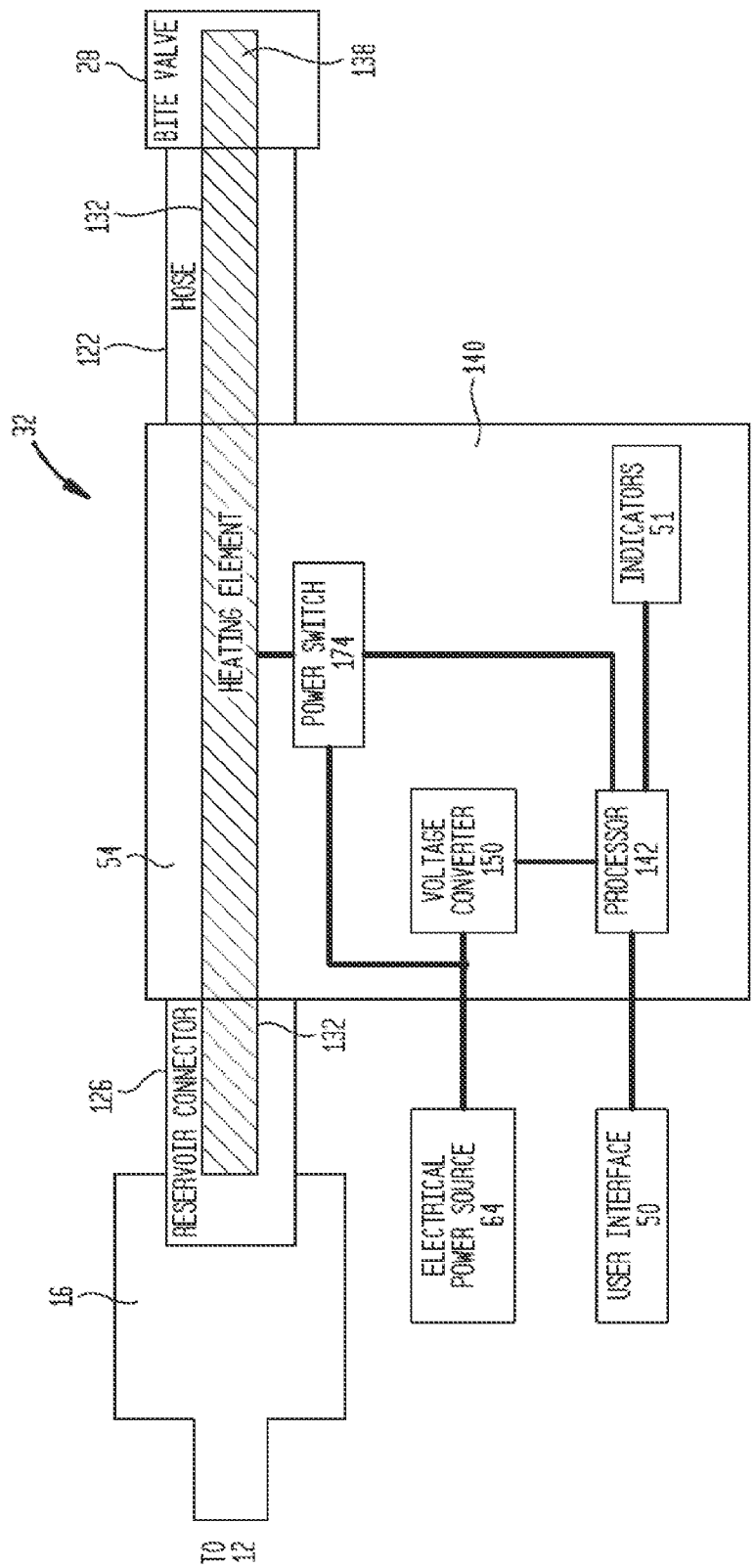
FIG. 11 shows one embodiment of a block diagram of heating assembly 52.

Referring now to FIG. 11, there is shown one embodiment of heating system 52 comprising heating assembly 54, electronic control assembly 140, and electrical power source 64. Circuit 60, described in some detail both above and below, may comprise any one or more of power switch 155, voltage converter 150, processor 142, and optional indicator(s) 51, which may be configured to provide a visual indication to the user by means of one or more LEDs, for example, as to the current operational mode of electronic control system 140, whether the system is on or off, the state of charge or voltage of electrical power source 64, and error messages. Embodiments of heating system 52 other than that shown in FIG. 10 are contemplated.

Figure 12:
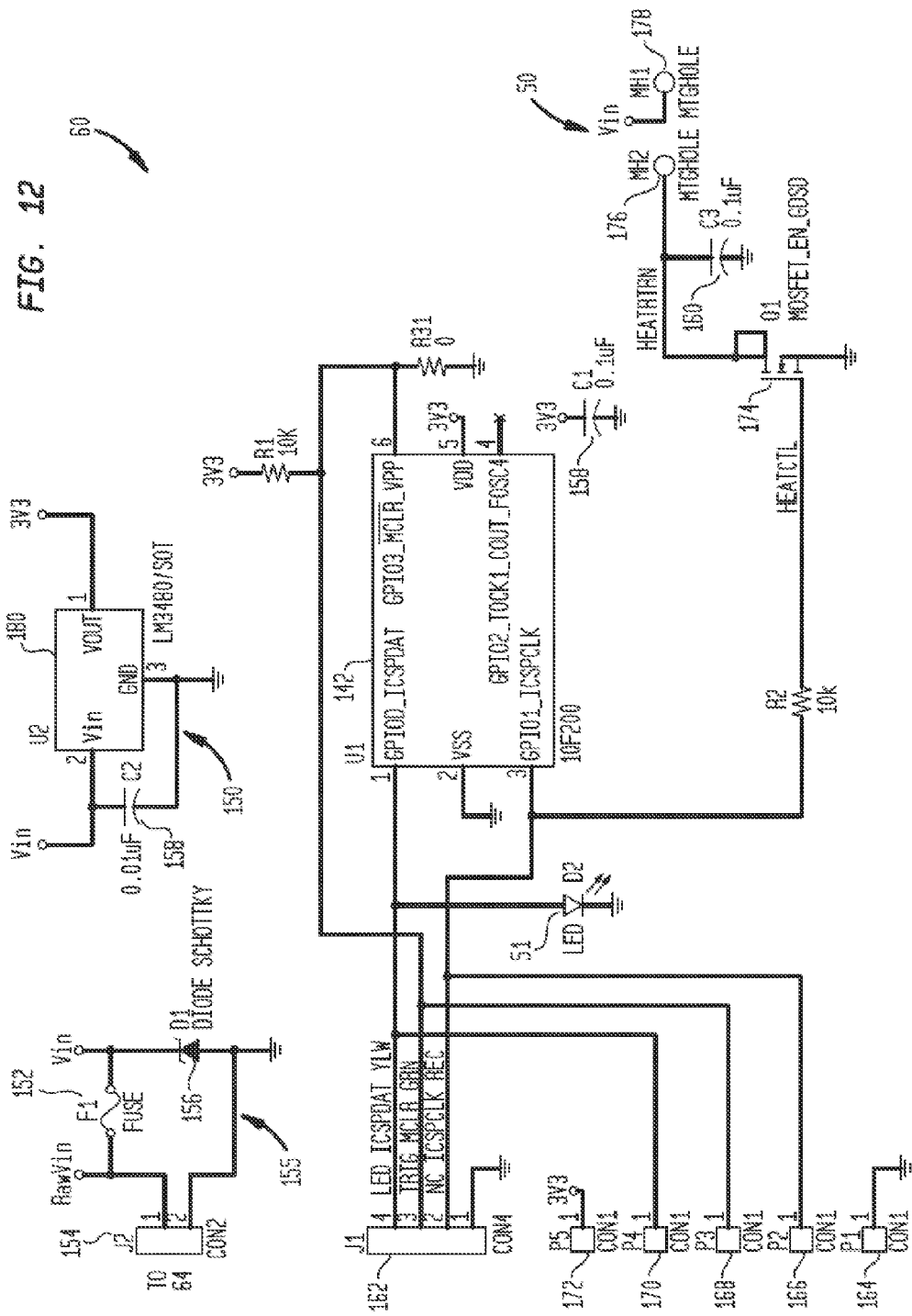
FIG. 12 shows one embodiment of heating circuitry 60 and electronic control system 140.

FIG. 12 shows one embodiment of circuit 60, which comprises processor 142, voltage converter 150, user actuated control/interface 50, and visual indicator 51. Circuit 60 employs microprocessor 142 and power switch 174 to control power transfer from electrical power source 64 to a heating element 132 operably connected to circuit 60 via user actuated control or switch 50. In one embodiment, processor 142 is configured to operate in different modes. In one mode, for example, user input is accepted via a suitable user interface (e.g., user actuated control 50 in combination with visual indicator 51) operably connected to connector 162 to turn on and off electrical power provided to heating element 132 through user actuated control or switch 50. In another mode, for example, heating element 132 is constantly on, or optionally provided with current according to a pulse wave modulation scheme to reduce power consumption. Such an operational mode may be configured to require no user input, other than to turn it on. In still another mode, a temperature sensor is disposed at a suitable location near heating element 132 and operated according to feedback control scheme where, for example, under the control of processor 142 heating element 132 is provided with electrical current when the ambient temperature detected by the temperature sensor falls below a predetermined lower threshold, such as about 31 degrees F., about 32 degrees F., about 33 degrees F., about 34 degrees F., about 35 degrees F., about 36 degrees F., or any other suitable predetermined lower threshold temperature. Such a feedback control mode can further include terminating the provision of electrical current to heating element 132 under the control of processor 142 when the ambient temperature detected by the temperature sensor rises above a predetermined upper threshold, such as about 35 degrees F., about 36 degrees F., about 37 degrees F., about 38 degrees F., about 39 degrees F., or about 40 degrees F., or any other suitable predetermined upper threshold temperature.

Continuing to refer to FIG. 12, and in the illustrated embodiment of circuit 60 and electronic control assembly 140 shown, processor 142 is programmed through connector 162, or alternatively through any of connectors 164, 166, 168, 170 and/or 172. Circuit 60 is protected from excessive current and reverse voltage by fuse circuit 155. The low voltage needed to power processor 142 and power switch is regulated by voltage regulator/converter circuit 150. Optional visual indicator/LED 51 can be used as an electrical power indicator if there is no user interface connected at 162. Self-resetting fuse 152 prevents excess current in heating element 132. Schottky diode 156 protects fuse circuit 155 from reverse input voltage. Elements 158, 160 and 158 are decoupling capacitors. Element R1 is a pull-up resistor for in-circuit processor programming. Element R2 is a current limiting resistor to protect power transistor 174. Element R3 is an optional resistor that may be provided as a build option to indicate to firmware in processor 142 of different circuit modes. Power transistor 174 controls current delivery to heating element 132. Processor 142 is configured to accept user input and provide different operational modes, controls indicator/LED 51, and controls power transistor 174. Voltage regulator/converter circuit/chip 184 provides regulated appropriate control voltages, and voltages to operate processor 142.

According to one embodiment, processor 142 is a 10F200 processor manufactured by Microchip Technologies, voltage controller chip 180 is an LM3480 voltage regulator manufactured by Texas Instruments, and power transistor 174 is an IRLL2705 power transistor, also manufactured by Texas Instruments. Incorporated by reference, each in its respective entirety, are the following data sheets and documents, which are also filed on even date herewith in an accompanying Information Disclosure Statement, and which describe in further detail some of the foregoing electronic components: (1) Microchip PIC10F200/202/204/206 Data Sheet, 6-Pin, 8-bit Flash Microcontrollers, DS41239D; (2) Texas Instruments LM3480 100 mA, SOT-23, Quasi Low-Dropout Linear Voltage Regulator, SNVS011E—Revised March 2013; and (3) PD-91380B IRLL2705 HEXFET Power MOSFET dated Jan. 22, 1999. Those skilled in the art will understand that the foregoing and other components of circuit 60 and electronic control assembly 140 are not limited to the specific components described and disclosed herein, which are provided as illustrative, but non-limiting examples. For example, processor 142 is not limited to being a microcontroller, but may also be any one or more of a CPU, a microprocessor, a controller, or any other suitable type of processor. In addition to those explicitly described and disclosed herein, many other types of voltage regulator and converter circuits, integrated circuits, and power transistors may also be used.

As described briefly above, circuit 60 may include a temperature feedback control sensor configured to provide a temperature signal or other data or information to processor 142. Upon processor 142 determining that the ambient temperature in the vicinity of the temperature feedback control sensor, disposed, for example, near bite valve 28, has fallen below a predetermined threshold, heat is applied to heating element 132 through the action of processor 142 so that the temperature in the vicinity of the temperature sensor may be returned to an acceptable level. As described above, processor 142 may also be configured to terminate the provision of electrical current to heating element 132 once the temperature sensor indicates that temperatures in the vicinity of heating element 132 are sufficiently high.

Still referring to FIG. 12, user-operable control/user interface 50 is operably connected to processor 142. Processor 142, user-operable control 50, and visual indicator 51 are configured to operate in conjunction with electrical power source 64 to permit controllable delivery of electrical current from electrical power source 64 to heating assembly 54 in hydration system 10. According to one embodiment, processor 142 is configured to include at least one programmable memory for storing machine-readable instructions corresponding to at least two of a first burst heating mode, a second constant heating mode, and a third temperature feedback heating control mode. In such an embodiment, processor 142 is configured to execute the at least two heating modes, and at least two of the heating modes are selectable by the user through user-operable control/user interface 50.

Referring now to FIGS. 11 and 12, electronic control assembly 140 and processor 142 thereof may be configured to operate in the first burst mode for a first predetermined period of time upon being selected by the user, where the first predetermined period of time is determined by the processor in accordance with a sensed temperature signal, information or data, and the first predetermined period of time ranges between about 1 minute and about 20 minutes. Electronic control assembly 140 and processor 142 thereof may also be configured to operate in the second constant heating mode for a second predetermined period of time upon being selected by the user, where the second predetermined period of time ranges between about 1 hour and about 12 hours, and/or where the second constant heating mode further comprises pulse width modulation of the current delivered to the heating element. Electronic control assembly 140 and processor 142 thereof may further be configured to operate in the third temperature feedback heating control mode for a third predetermined period of time upon being selected by the user, where the third predetermined period of time ranges between about 1 minute and about 12 hours.

Electronic control assembly 140 and processor 142 thereof may additionally be configured to carry out a method of heating a drinkable fluid in at least one of hydration system 10, hydration hose 22, hydration hose bite valve 26, and heating assembly 54, where the method comprises selecting a first burst heating mode or a second constant heating mode, and in response to selecting the first burst heating mode or the second constant heating mode, delivering electrical current to heating element 132 disposed within at least portions of at least one of hydration hose 22 and bite valve 26, where electrical current is delivered to heating element 132 for a first predetermined short period of time in the first burst heating mode, and electrical current is delivered to heating element 132 for a second predetermined long period of time in the second constant heating mode.

Electronic control assembly 140 and processor 142 thereof may still further be configured to carry out a method of heating a drinkable fluid in at least one of hydration system 10, hydration hose 22, hydration hose bite valve 26, and heating assembly 54 where the method comprises selecting a first burst heating mode or a second temperature feedback heating mode, and in response to selecting the first burst heating mode or the second temperature feedback heating mode, delivering electrical current to heating element 132 disposed within at least portions of at least one of hydration hose 22 and bite valve 26, where electrical current is delivered to heating element 132 for a first predetermined short period of time in the first burst heating mode, and electrical current is delivered to heating element 132 for a second predetermined period of time in the temperature feedback heating mode, the second predetermined period of time being determined by the processor in accordance with a sensed temperature.

Electronic control assembly 140 and processor 142 thereof may yet further be configured to carry out a method of heating a drinkable fluid in at least one of hydration system 10, hydration hose 22, hydration hose bite valve 26, and heating assembly 54, where the method comprises delivering electrical current to heating element 132 operably connected to heating assembly 54 comprising housing 122 configured to permit the drinkable liquid to pass between proximal and distal ends of thereof and through at least one interior volume 130 thereof, heating element 132 comprising at least first and second ends 161 and 163, heating assembly 54 comprising heating element connection assembly 56, heating element connection assembly 56 being operably connected to or forming a portion of housing 122 and further being operably connected to first and second ends 161 and 163 of heating element 132, where heating assembly 54 is disposed between hose 22 and bladder or container 12 configured to hold the drinkable fluid, and at least portions of heating element 132 extend into at least portions of one of hose 22 and bite valve 26, heating element 132 being configured to heat drinkable fluid in proximity to at least portions thereof.

Table 1 below provides an example of firmware code for processor 142, where the first section of the code contains setup settings to configure processor options, and the next section contains code definitions that make the code more readable. Three global variables are provided. Function "msDelay" is a 1 ms delay loop. Function "done" provides instructions to put processor 142 to sleep when tasks have been completed. Function "blink" blinks led 51 for a prescribed on and off period of time. Function "main" contains button 50 and LED indicator 51 code, as well as the code for heating element control 174. In the firmware shown in Table 1, processor 142 spends most of its time in an ultra-low power sleep mode. When button/user actuated control 50 is pressed, processor 142 is brought out of the sleep mode to reboot itself. The software/firmware first tests boot registers to determine which event occurred to cause it to reboot. If the event has originated from any other state than a button press, then processor 142 is put back to sleep. If button 50 has been pressed by the user, processor 142 causes LED 51 to blink and waits for the user to release button 50 within the prescribed period of time. If the user fails to release button 50, processor 142 is put back into a sleep mode. If the user releases button 50 within a prescribed period of time of two seconds, current to heating element 132 is turned on. In the case where the system has just been powered up, processor 142 checks to see if button 50 is being pressed. If button 50 is pressed and held for two seconds, processor 142 goes into a constant on mode, and pulses current to heating element 132 in a pulse-width modulation mode.

Continuing to refer to Table 1, and in one embodiment, the described control system is activated by a series of timed button presses and releases, and is designed to reduce the chance that the control system will be activated accidentally, by sitting on the button for example. According to one embodiment, the control sequence is as follows:

1. The user first presses and holds button 50. Indicator/LED 51 starts blinking rapidly for 5 seconds.
2. When indicator/LED 51 stops blinking the user must release button 50 within 2 seconds.
3. Current then starts flowing to heating element 132, warming heating element 132 and melting frozen water that may be blocking drinking tube 22. LED 51 also starts blinking once per second as an indicator that the system has entered a heating cycle. Current then flows for between 2 and 10 minutes (depending on the design of heating element 132 and electrical power source 64 being employed).
4. The user should periodically try to drink from bite valve 26 to check if the blockage has been thawed.
5. If the blockage has been thawed before the heating time has elapsed, the user can shut off the current flow by holding button 50 down for 2 seconds.
6. If the user desires a constant-on mode, he or she presses and holds button 50 while connecting power source 64, or switching the power on if there is a power switch. This will activate heating element 132 in a reduced power mode. This mode can be deactivated by disconnecting power source 64 or switching the power off.

TABLE 1

Example Firmware Code for Processor 142

```
/*
 * File: main.c
 */
#include <xc.h>
#include <stdio.h>
#include <stdlib.h>
//#pragma config WDT=OFF
//#pragma config CP = ON
//#pragma config MCLRE = ON
_CONFIG(WDTDIS & PROTECT & MCLRE_OFF);
/* DEFINITIONS*/
#define _XTAL_FREQ 4000000
#define LED GP0
#define HEATCTRL GP1
#define UNUSED GP2
#define TRIG GP3
#define TRUE 1
#define FALSE 0
#define ON 1
#define OFF 0
#define PRESSED 0
#define NOTPRESSED 1
unsigned char i;
extern bit _powerdown;
extern unsigned char _resetbits;
void msDelay(unsigned int delay){
    for(/*nothing*/;delay > 0;delay--) { //each loop should be 1 ms
        TMR0 = 0xFF-30;
        while(TMR0 < 0xFF) {
        }
    }
}
void done (void) {
    LED = OFF;
    HEATCTRL = OFF;
    i=GPIO;    //GPIO read to prepare for sleep (needed for GPIO change interrupt)
    SLEEP ( );
}
void blink (unsigned char ton, unsigned char toff) {
    LED=ON;
    msDelay(ton);
    LED=OFF;
    msDelay(toff);
}
int main(int argc, char** argv) {
    /*Set the TRIS register:
      GP0 is output
      GP1 is output
      GP2 is output
      GP3 is input*/
    // make GP2 an output to prevent false triggers, it is a NC pin
    TRIS = 0b00001000;
    /* Set option bits:
      GPWU=0 Enabled(GPIO change)
      GPPU=1 Disabled(weak GPIO pullups)
    TOCS=0 Timer0 clock source internal
      TOSE=0 Timer0 source low to high transition
      PSA=0 Prescaler to Timer0
      PS=100 Prescaler 1:32*/
//    clrdog( ); //must do this before modifying OPTION prescaler
    OPTION = 0b01000100;
    /*A copy of the status register at boot time is held in _resetbits*/
    //ADD THIS---check for a normal power up and the button held,
go into demo mode
    // was it a GPIO change wakeup, if not go to sleep
    LED = OFF;
    HEATCTRL = OFF;
    //was it a power up with the button held?
    //yes, go into constant pulse mode
```

TABLE 1-continued

Example Firmware Code for Processor 142

```
        if((_resetbits & 0b00001000) == 0b00001000) {
          blink(3000,300); //blink(100,300);//blink(100,300);
          if (TRIG == NOTPRESSED) done( );
          while (1) {
            blink (250,0);
            HEATCTRL = ON;
            msDelay(1000*10);
            blink(150,0);
            HEATCTRL = OFF;
            msDelay(1000*10);
          }
        }
        // was it a GPIO change from sleep? if not, go back to sleep
        if((_resetbits & 0b10000000) != 0b10000000) { done( );}
        //if the button isn't pressed any more, must have been false trigger
        if (TRIG == NOTPRESSED) { done( );}
        blink(250,750); // indicate things are getting started
        // if the button isn't still pressed after a delay,
        // must have been a false trigger, go back to sleep
        if (TRIG == NOTPRESSED) {LED = OFF; done( ); }
        //blink rapidly for 2 seconds, checking that the button stays
depressed
        for(i=0; i<16; i++) {
          LED = ON;
          msDelay(125);
            LED = OFF;
          if (TRIG == NOTPRESSED){done( ); }
          msDelay(125);
          if (TRIG == NOTPRESSED){done( );}
        }
        // turn off the LED to indicate the release the button
        LED = OFF;
        // wait to give the user time to respond
        msDelay(2000);
        if(TRIG==PRESSED){done( );} // if the user held it too long,
go to sleep
        HEATCTRL = 1; //turn on the heat!!!
        /* run a 2 second loop for 5 minutes*/
        for(i=0; i< 30*5; i++){
          LED = ON;
          msDelay(250);
          LED = OFF;
          msDelay(2000-250);
          //if the button is held down for 2 seconds, cancel the heat and
sleep
          if (TRIG == PRESSED){
            msDelay(2000);
            if(TRIG == PRESSED){
            //HEATCTRL = OFF;
            done( );
            }
          }
        }
        // done with a heating cycle, shut down
        done( );
}
```

Upon having and understood the present specification and drawings, those skilled in the art will understand that at least some of the various embodiments disclosed and described herein solve certain problems and provide certain solutions existing in the prior art, such as providing a heating system where no modification of hydration bladder or container 12 is required, no wires need extend into hydration bladder or container 12, heating assembly 54 may be easily connected to most types of recently-manufactured hydration reservoirs or bladders, electrical cabling is reduced, assembly and manufacturing of a heating system or its various components is made easier, and a heating system may be easily retrofitted in existing hydration systems.

The above-described embodiments should be considered as examples of the present invention, rather than as limiting its scope. In addition to the foregoing embodiments of the invention, review of the detailed description and accompanying drawings will show that there are many other embodiments of the present invention. Accordingly, many combinations, permutations, variations and modifications of the foregoing embodiments of the present invention not set forth explicitly herein will nevertheless fall within the scope of the present invention. For example, and as described above, the present invention is not limited to means and methods for heating drinkable fluids, and my instead be used to heat aerosols, fluids, gels and semi-solids for other applications and purposes.

I claim:

1. A heating assembly and hydration hose for a portable hydration system, comprising:
    a housing comprising a proximal hydration bladder connector and a distal hose connector;
    a heating element connection assembly comprising a plurality of heating element terminals;
    an electronic control assembly comprising an electrical circuit operably connected to the plurality of heating terminals, the electronic control assembly being configured for connection to an electrical power source;
    a heating element;
    a hydration hose having a proximal end, a distal end, and an interior, the proximal end of the hydration hose being configured for attachment to the distal hose connector,
    wherein the heating assembly forms a module comprising the housing, the heating element connection assembly, and the electronic control assembly, the housing is operably connected to the proximal end of the hydration hose by the distal hose connector, the heating assembly is configured to permit a drinkable liquid to pass through at least one interior volume thereof, the heating element extends into the proximal end of the hydration hose from the heating assembly and is disposed within and extends along the interior of the hydration hose to a location near or at the distal end of the hydration hose, the heating element is further disposed at least partially in the interior volume of the heating assembly and comprises first and second ends operably connected to at least two of the plurality of heating element terminals, respectively, the heating element is configured to receive electrical current from the electrical power source through the electronic control assembly and the at least two heating element terminals to provide resistive heating of the heating element and thereby heat the drinkable fluid in at least the interior volume of the heating assembly and in the interior of the hydration hose, and the proximal hydration bladder connector is configured for releasable attachment to a hydration bladder or container configured to contain the drinkable fluid.

2. The heating assembly and hydration hose of claim 1, wherein the at least two of the plurality of heating element terminals are disposed inside or adjacent to the interior volume.

3. The heating assembly and hydration hose of claim 1, wherein the heating assembly further comprises a cover and corresponding O-ring configured to cover and protect the electronic control assembly.

4. The heating assembly and hydration hose of claim 1, wherein the heating element comprises a metal or metal alloy wire or plurality of wires covered by an electrically insulative sheath.

5. The heating assembly and hydration hose of claim 1, wherein the heating element connection assembly further comprises upper and lower portions, and the heating element terminals further comprise first and second exterior heating element terminals disposed near or on the upper portion, and first and second interior heating element terminals disposed near or on the lower surface adjacent to the interior volume of the heating assembly, the respective first and second interior and exterior heating element terminals being electrically connected to one another.

6. The heating assembly and hydration hose of claim 1, wherein the electronic control assembly is operably connected to a user-actuated control configured to selectably control the delivery of electrical current from the electrical power source to the heating element.

7. The heating assembly and hydration hose of claim 5, wherein at least portions of the upper surface and the first and second exterior heating element terminals are disposed outside the interior volume of the heating assembly, at least portions of the lower surface and the first and second interior heating element terminals are disposed inside or adjacent to the interior volume, and the first and second interior heating element terminals comprise the at least two of the plurality of heating terminals operably connected to first and second ends of the heating element, respectively.

8. The heating assembly and hydration hose of claim 5, wherein the housing comprises an opening configured to receive the heating element connection assembly thereon or therein.

9. The heating assembly and hydration hose of claim 8, wherein the heating element connection assembly comprises a first O-ring configured to form a first seal between the housing and the heating element connection assembly.

10. The heating assembly and hydration hose of claim 1, wherein the hydration hose further comprises a bite valve located at the distal end thereof, and the heating element extends into at least portions of the bite valve.

11. The heating assembly and hydration hose of claim 1, wherein the first and second exterior heating element terminals further comprise threaded first and second bolts, respectively.

12. The heating assembly and hydration hose of claim 1, wherein the electronic control assembly is operably connected to a visual indicator configured to show a user whether electrical current is being delivered from the electrical power source to the heating element.

13. The heating assembly and hydration hose of claim 6, wherein the user-actuated control is located near the distal end of the hydration hose.

14. The heating assembly and hydration hose of claim 1, further comprising the electrical power source.

15. The heating assembly and hydration hose of claim 14, wherein the electronic control assembly is mounted on a printed circuit board.

16. The heating assembly and hydration hose of claim 15, wherein the hydration hose further comprises a bite valve support member located at or near the distal end thereof, and the heating element extends through at least portions of the bite valve support member.

* * * * *